INVENTOR:
ROBERT W. McCULLOUGH.

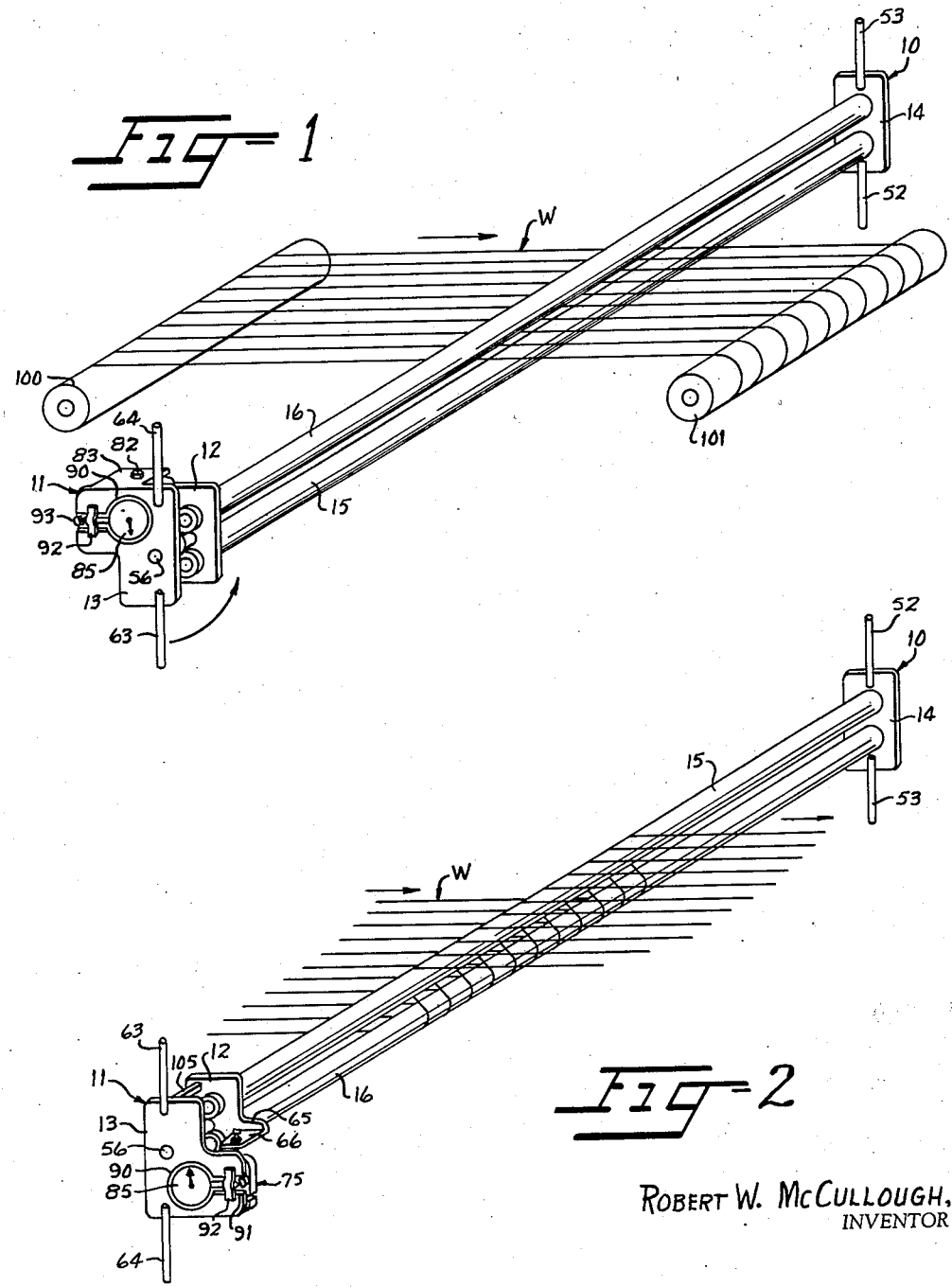

BY Eaton + Bell

ATTORNEYS.

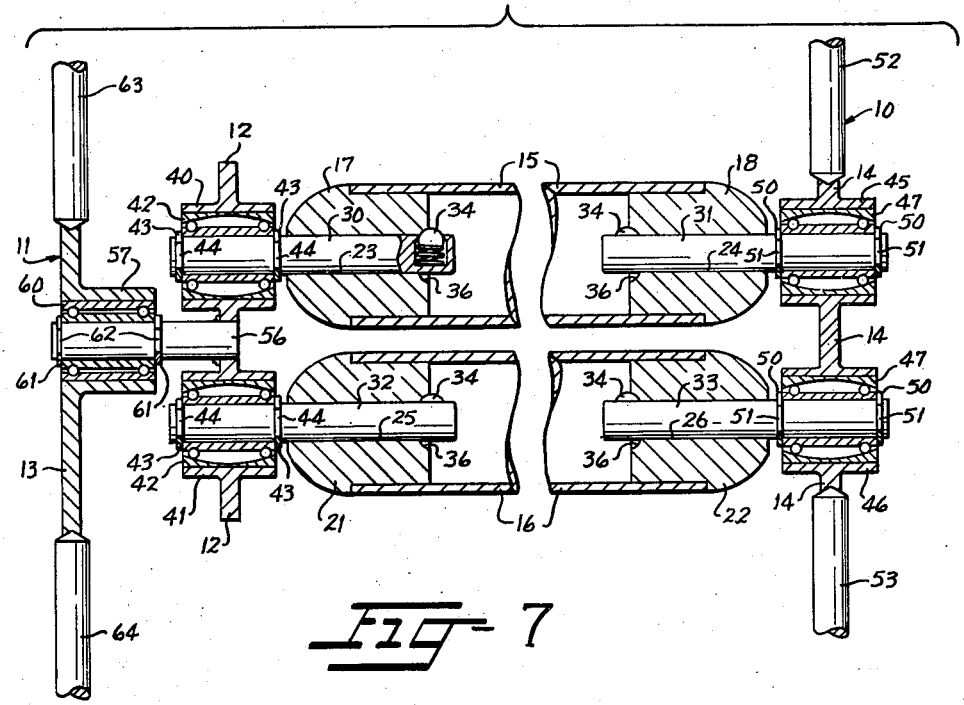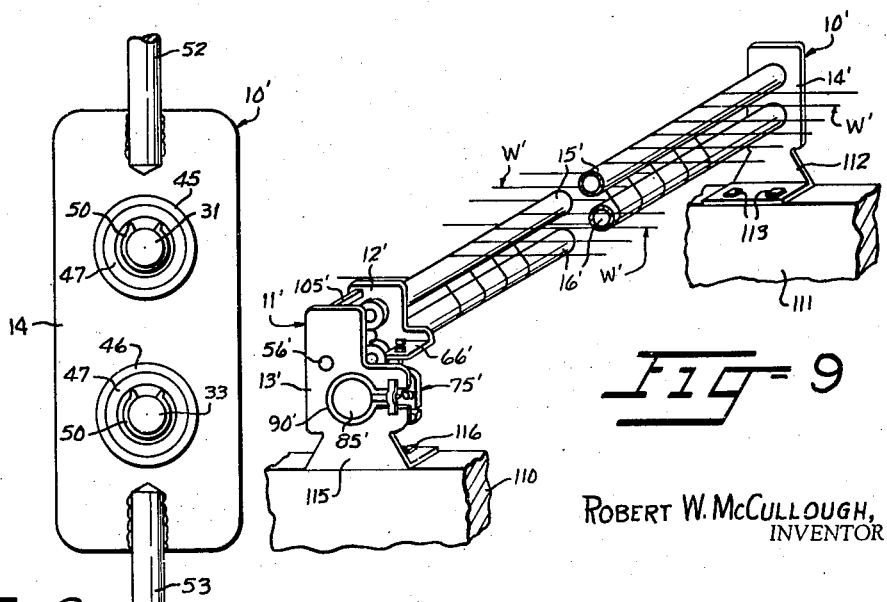

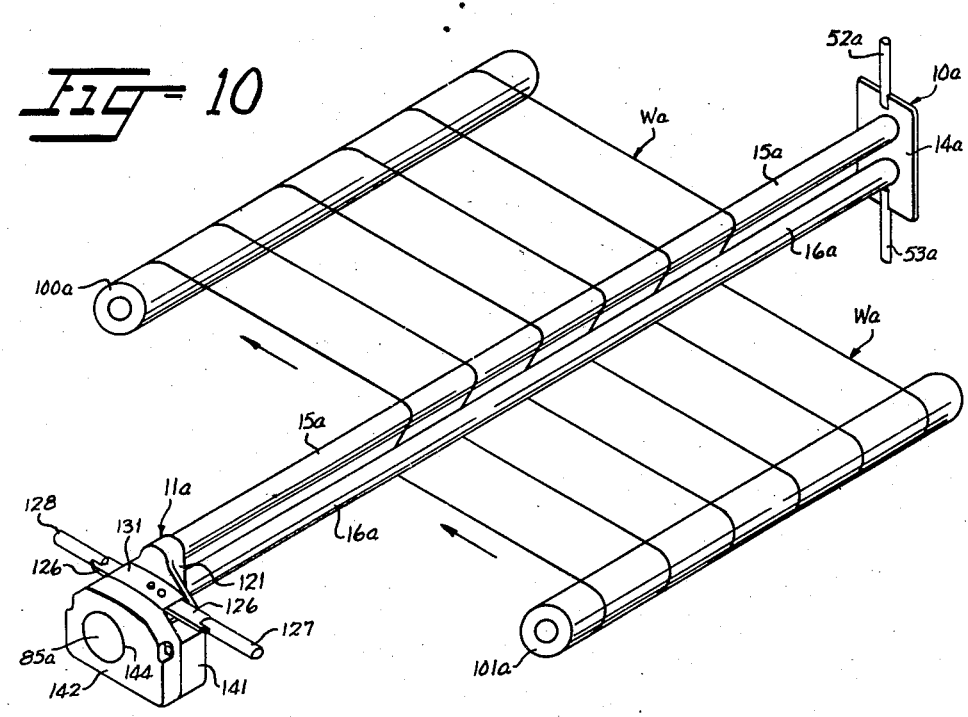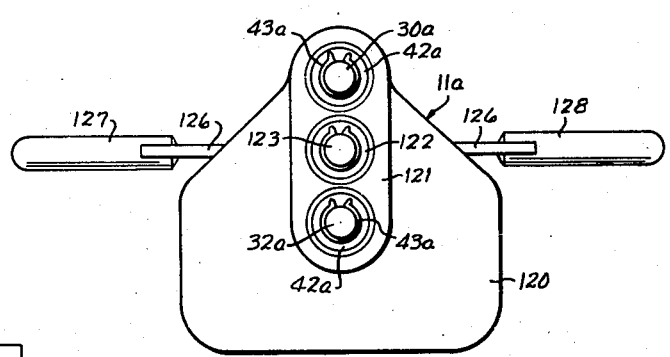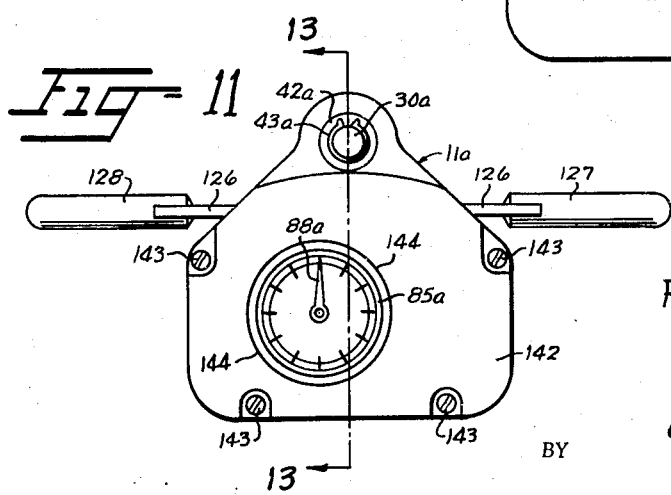

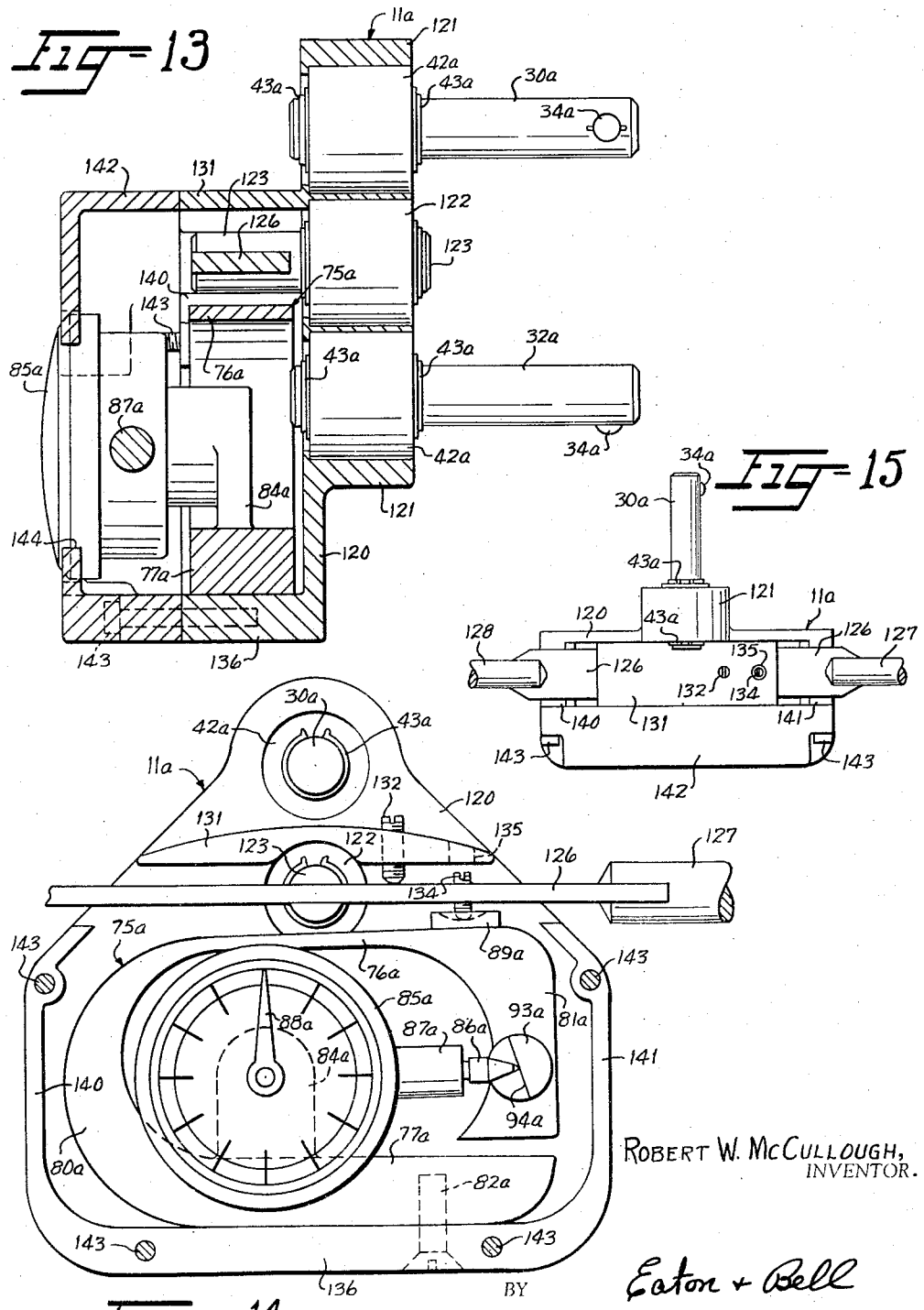

United States Patent Office 2,833,145
Patented May 6, 1958

1

2,833,145

APPARATUS FOR DETERMINING TENSION IN WEB AND STRAND MATERIAL

Robert W. McCullough, Clemson, S. C.

Application January 28, 1952, Serial No. 268,591

20 Claims. (Cl. 73—144)

This invention relates to gauges and the like and more especially to an improved apparatus for determining the tension in web, strand or sheet material. Such apparatus may be termed a tensiometer.

In processing strand or web material such as passing textile strands or fabric through slashers for applying size solution thereto or in other processes, it is often necessary to determine the tension being maintained in the moving strand or web material so that the usual tension means or the like associated with the processing machines may be adjusted, as desired, to maintain a uniform tension in the web or strand material in order to maintain a uniform quality.

It is, therefore, an object of this invention to provide a novel apparatus for determining the tension in web or strand materials, said apparatus being provided with an indicator or gauge means thereon for indicating the tension in the web or strand material and which apparatus is made from a minimum of parts and may be easily constructed and operated and may also be either portable or fixed on a particular processing machine as a part of the machine.

It is another object of this invention to provide an apparatus, which may be termed a tensiometer, for determining the tension in strand or web material which comprises a head element and a foot element having means thereon for removably receiving a pair of closely spaced bars or rolls wherein the head element and the foot element may be positioned adjacent opposite sides of a moving sheet of web or strand material with the web or strand material passing between the rolls. The head element primarily comprises two major parts; namely, a roll support and a gauge or indicator support which are pivotally interconnected. The corresponding head ends of the rolls are supported by the roll supports of the head element. The foot element may be identical to the head element or may include only a roll support in which the foot ends of the rolls are carried, the support having handles projecting therefrom adapted to be grasped and manipulated by an operator.

The gauge or indicator support associated with the head element is also provided with one or more handles, suitable connections being provided between the gauge or indicator carried by the indicator support and the corresponding roll support. A device is thus provided whereby an operator or operators may rotate the head element and foot element in such a manner that the sheet of web or strand material passing therebetween will pass beneath one of the rolls and then upwardly between the rolls and then over the other of the rolls, the torsional load effected upon the rolls with respect to the indicator support by the web or strand material causing the roll support associated with the head element to tend to pivot relative to such support, the indicator or gauge indicating the force of such tendency which is a measure of the force being exerted on the rolls and, consequently, the tension in the moving strand or web material.

It is still another object of this invention to provide a tensiometer of substantially the character described wherein the handle or handles associated with the head element and the foot element of the tensiometer may be omitted and the indicator support of the head element and the foot element may be secured to the frame of a processing machine, such as a slasher and the like. In this instance, the axes of the two rolls are disposed in perpendicular relation to the normal path of travel of the sheet of web or strand material so that the web or strand material passes outwardly of one of the rolls and then between the rolls and then outwardly of the other rolls substantially in the form of a letter S whereby the tension in the web or strand material creates a torsional effect about a common axis of the two parallel rolls. This results in the tension in the web or strand material being transmitted from the roll support associated with the head element to the indicator carried by the indicator support to thus indicate the tension in the web or strand material at all times.

Some of the objects of the invention having been stated, other objects will appear as the description proceeds, when taken in connection with the accompanying drawings, in which—

Figure 1 is an isometric view of the improved portable type of tensiometer showing the same in one position with strand material passing between the rolls thereof in a straight line;

Figure 2 is a view similar to Figure 1 but showing the improved tensiometer rotated 180 degrees from the position shown in Figure 1 and showing the sheet of web or strand material passing beneath and about half around one of the rolls and then between the rolls and about half around and above the other of the rolls, this being the operating position of the tensiometer;

Figure 7 is a longitudinal vertical sectional view through the entire tensiometer taken substantially along the line 7—7 in Figure 3 and with portions of the handles associated with the head and foot elements being broken away and omitting the gauge and its support for purposes of clarity;

Figure 8 is an enlarged elevation of the outer end of the foot element of the tensiometer with portions of the handles thereof being broken away;

Figure 9 is an isometric view of a modified form of the tensiometer showing the same mounted on the frame of a machine such as a slasher, tenter frame or other strand or web handling machine;

Figure 10 is an isometric view showing a third form of tensiometer wherein the head element is constructed somewhat differently from the manner in which the head element of the first two forms of the invention is constructed;

Figure 11 is an enlarged end elevation of the head element shown in the lower left-hand portion of Figure 10;

Figure 12 is an elevation showing the opposite side of the head element from that shown in Figure 11 and omitting the rolls from the roll supporting spindles;

Figure 13 is an enlarged vertical sectional view taken substantially along line 13—13 in Figure 11;

Figure 14 is an enlarged elevation similar to Figure 11, omitting the cover from the gauge and roll support, with parts broken away;

Figure 3:
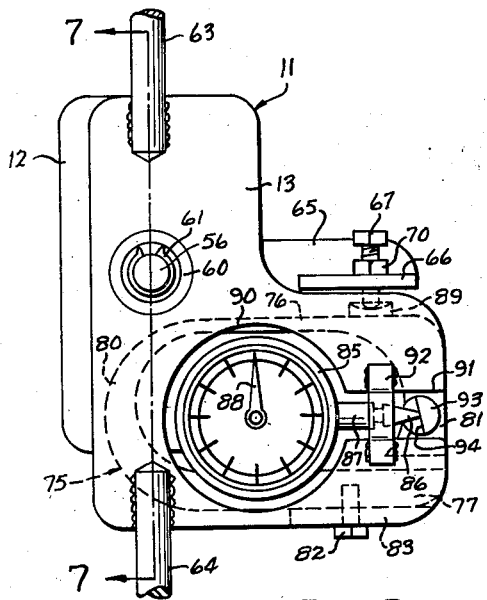
Figure 3 is an enlarged elevation of the outer end of the head element of the tensiometer with portions of the handles thereof broken away.

Figure 15 is a top plan view of the head element shown in Figure 11 with portions of the handles broken away, Referring more specifically to the drawings, the numeral 10 broadly designates the foot end, member or element of the tensiometer and the numeral 11 broadly designates the head end, member or element of the tensiometer. The form of the tensiometer shown in Figures 1 to 8, inclusive, is a portable type of tensiometer and the head element thereof comprises a roll support 12 and a gauge or indicator support 13 which will be later described in detail.

The foot element 10 may be identical to the head element 11, but, for purposes of illustration, is shown as differing from the head element 11 and it comprises a substantially rectangular plate or roll support 14. The roll supports 12 and 14 of the respective head and foot elements 11 and 10 support opposite ends of a pair of identical tension rolls, namely, a first tension roll or tension sensing member 15 and a second tension roll or tension sensing member 16. It will be observed in Figure 7 that the opposite ends of the tension rolls 15 and 16 are removably and rotatably mounted on the roll supports 12 and 14.

The tension rolls 15 and 16 extend in closely spaced parallel relation to each other and are preferably of tubular construction (Figure 7), the ends of the tubular tension roll 15 are closed by closure members 17 and 18 and the ends of the tubular tension roll 16 are closed by closure members 21 and 22. The closure members 17, 18 and 21, 22 are secured in the ends of the respective tubular tension rolls 15 and 16, by any suitable means, such as a press fit, and the outer ends of the closure members 17, 18, 21 and 22 are preferably rounded as shown in Figure 7 to eliminate any sharp edges so that the contour of the tension rolls 15 and 16 will be smooth and continuous to prevent damage to the web or strand material.

The closure members 17, 18 and 21, 22 are provided with respective axially alined bores 23, 24 and 25, 26 therein in which the proximate portions of spindles 30, 31 and 32, 33, respectively, are slidably mounted. The ends of the spindles 30, 31, 32 and 33, which are inserted in the respective bores 23, 24, 25 and 26, are each provided with a spring loaded detent 34 and the marginal portion of the internal surface of each of the closures 17, 18, 21 and 22 adjacent the corresponding bores 23, 24, 25 and 26 are beveled, as at 36.

Thus, upon the closures 17, 18, 21 and 22 being placed on the corresponding spindles 30 to 33, inclusive, the detents 34 will bear against the corresponding beveled surfaces 36 to retain the tension rolls 15 and 16 on the proximate portions of the spindles 30 to 33, inclusive. The spindles 30 and 32 are mounted for rotation in spaced boss portions 40 and 41, respectively, integral with the roll support 12, by means of suitable bearings such as anti-friction bearings 42. The outer races of the anti-friction bearings 42 are secured, as by a press fit, in the boss portions 40 and 41 and the spindles 30 and 32 are retained in the inner races of the anti-friction bearings 42 by suitable snap rings 43. The spindles 30 and 32 are each provided with suitable annular grooves 44 for reception of the snap rings 43.

The roll support 14 of the foot element 10 also has a pair of spaced boss portions 45 and 46 integral therewith in which the corresponding ends of the spindles 31 and 33, respectively, are mounted for rotation by any suitable means such as anti-friction bearings 47, preferably of the self-alining type. The outer races of the anti-friction bearings 47 are also suitably secured in the boss portions 45 and 46, as by a pressed fit, and the spindles 31 and 33 are retained in the inner races of the anti-friction bearings 47, by any suitable means such as snap rings 50, there being annular grooves 51 provided in each of the spindles 31 and 33 for reception of the snap rings 50. The roll support 14 of the foot element 10 has the proximate ends of a pair of handles 52 and 53 suitably secured thereto as by said handles being slotted and fitted onto the roll support and secured thereto, as by welding, these handles 52 and 53 being shown in the form of relatively short rods. The handles 52 and 53 are preferably disposed in diametrically opposed relationship.

The roll support 12 of the head element 11 is rotatably or oscillatably connected to the indicator support 13 in such a manner as to permit movement of the tension rolls 15 and 16 relative to the indicator support 13 about a common axis substantially bisecting the distance between the tension rolls 15 and 16 and extending in parallel relation to the axes of the tension rolls 15 and 16. To this end, a stub shaft 56 is fixed in the roll support 12 of the head element 11 at a point substantially midway between the spindles 30 and 32.

The indicator support 13 has an enlarged or boss portion 57 integral therewith in which the outer race of an anti-friction bearing 60 is secured, as by a press fit. The inner race of the anti-friction bearing 60 surrounds the shaft 56 and the shaft is secured in the inner race of the bearing 60 by suitable snap rings 61 which are disposed in annular grooves 62 in the shaft 56.

It is evident that the spindles 30 to 33, inclusive, may be rotatably mounted in the corresponding boss portions 40, 41, 45 and 46 and the stub shaft 56 may be oscillatably mounted in the boss portion 57 of the indicator support 13 by any suitable means, not necessarily anti-friction bearings. However, anti-friction bearings are preferably employed to insure freedom of rotation of the spindles 30 to 33 and the shaft 56 to facilitate an accurate reading of the indicator to be presently described.

Suitable handles 63 and 64, which are shown in the form of rods, are secured to opposite ends of the indicator support 13 as by having the ends thereof slotted and fitted onto the indicator support and secured thereto, as by welding. The handles are preferably diametrically opposed and in alinement with each other and substantially in alinement with the axes of the shaft 56 and the spindles 30 and 32.

The roll support 12 of the head element 11 has a projection or force transmitting arm 65 on one side thereof which is provided with a flange 66 for supporting an abutment 67 shown in the form of an adjustment screw threadably penetrating the flange 66 and being held in the desired position by a lock nut 70. The abutment 67 is adapted to engage a suitable gauge having an indicator associated therewith upon the tension rolls 15 and 16 being moved about the axis of the stub shaft 56 in a counter-clockwise direction in Figure 6 or in a clockwise direction in Figures 2 and 3. The abutment transfers the force of this movement to the gauge which is suitably calibrated to indicate the force or tension. The particular gauge shown in the drawings is merely shown by way of illustration only, it being evident that many other types of gauges and indicators of conventional or other design may be utilized.

The gauge, as illustrated, is broadly designated at 75 and may be of a type manufactured by W. C. Dillon and Company, Inc., 1421 South Circle Avenue, Hyde Park, Illinois. The gauge 75 comprises a substantially U-shaped member including legs 76 and 77, which are bridged at corresponding ends by a bridging portion 80. The leg portion 76 has an inwardly projecting anvil supporting portion 81 integral therewith which extends toward the leg 77 of the gauge 75 and terminates in spaced relation thereto. The leg 76 and portion 81 may be termed collectively as a resilient cantilever.

The leg 77 of the gauge 75 is suitably secured, as by a screw 82, to a flange portion or projection 83 projecting from the indicator support 13. The leg 77 of the substantially U-shaped member 75 has an inwardly projecting portion 84 intermediate the ends thereof on which a suitably calibrated indicator device 85 is secured.

It has been found most practicable to determine the graduation of the indicator device empirically. This indicator device 85 has a spring loaded plunger 86 mounted therein which is guided within a tubular extension 87 integral with the indicator device 85. It will be noted that the leg 76 has a concave pressure point plug 89 threadably embedded therein with which the rounded end of screw 67 makes point contact.

The indicator support 13 has a suitable opening 90 therein through which the indicator device 85 projects to facilitate reading by an operator of the tensiometer. The indicator support 13 also has a relatively narrow slot or opening 91 therein communicating with the opening 90 and in which the tubular extension 87 and the plunger 86 of the indicator device 85 are disposed. A strap member 92 is provided which spans the slot 91 and is secured at opposite ends thereof to the indicator support 13 for reenforcement.

The force transmitting arm 65 and the leg 76 of the gauge 75 may each be termed as force transmitting elements, since relative movement of either toward the other transmits force to the force measuring means exemplified by the indicator device 85 in a manner to be presently described.

The anvil supporting portion 81 of the substantially U-shaped gauge member 75 has a gauge anvil 93 suitably secured therein, as by a set screw 95, which is provided with a plunger engaging surface 94 (Figure 3) which is inclined relative to the plunger 86 and the leg 76 of the substantially U-shaped member 75.

Thus, upon pressure being applied to the abutment 67 toward the gauge member 75, the cantilever, comprising the leg 76 and the anvil supporting projection 81 thereon, is caused to move toward the leg 77 and the inclined or angular surface 94 on the anvil 93 will cause the spring loaded plunger 86 of the indicator device 85 to move inwardly to thereby move the pointer 88 accordingly, the face of the indicator element 85 being suitably calibrated to thereby indicate the pressure exerted by the abutment 67 on the leg 76 of the substantially U-shaped member 75.

Referring to Figure 1, there will be observed a sheet of web or strand material W which is moving from left to right under tension, there being as suitable let-off mechanism which is shown schematically and indicated at 100, from which the sheet of web or strand material W passes under tension to a take-up mechanism also shown schematically as a take-up roll 101. In view of the large number of processes in which web and strand materials are moved under tension, it is evident that there are many different ways in which the web or strand material W may be placed under tension and, therefore, the source of the web or strand material and the means for maintaining tension therein are shown schematically in Figure 1.

Figure 4:
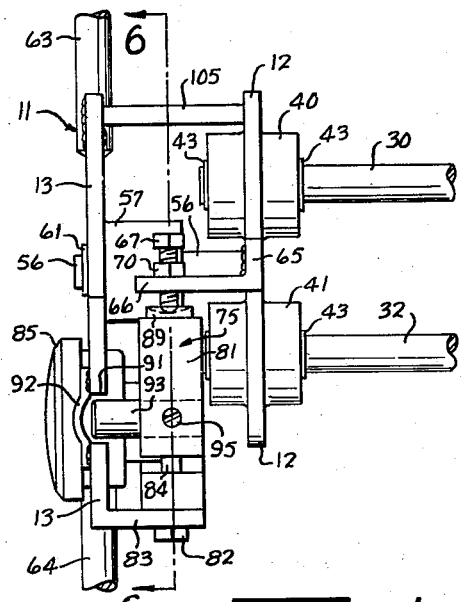
Figure 4 is an elevation, looking at the right-hand side of Figure 3, omitting the rolls from the roll support and with portions of the roll support broken away.
Figure 5:
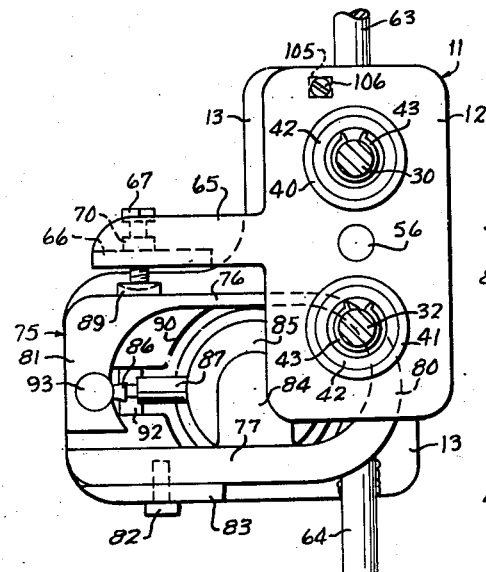
Figure 5 is an inside elevation of the head element of the tensiometer looking at the right-hand side of Figure 4.
Figure 6:
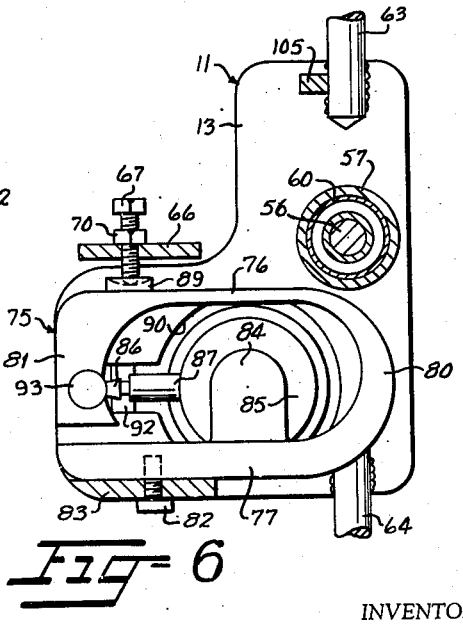
Figure 6 is a vertical sectional view taken along the line 6—6 in Figure 4.

In order to prevent excessive movement of the abutment 67 away from the substantially U-shaped gauge member 75, the roll support 12 has a stop member 105 (Figures 2, 4 and 7) suitably secured thereto, as by a screw 106. This stop member 105 projects toward and terminates closely adjacent the inner surface of the indicator support 13, the end of the handle 63 adjacent the indicator support 13 being disposed in the path of the stop member 105, as is shown in Figures 4 and 6. Thus, the stop member 105 will engage the corresponding end of the handle 63 in the event the tension in the web or strand material W tends to rotate the roll support 12 in a clockwise direction in Figure 6. With the tensiometer in the position shown in Figure 3, the abutment 67 is so adjusted that it does not exert pressure on the leg 76 of the substantially U-shaped gauge member 75 when the handle 63 is engaged by the stop member 105 and in the absence of tension in the web or strand material W.

In operation, the tension rolls 15 and 16 are mounted upon the spindles 30 and 32 associated with the head element 11, whereupon the operator positions the tension rolls 15 and 16 so they are disposed adjacent the opposite surfaces of the sheet of web or strand material W, i. e., so the sheet of web or strand material W moves between the tension rolls 15 and 16 substantially as shown in Figure 1. A second operator then inserts the spindles 31 and 33 of the foot element 10 in the corresponding bores 24 and 26 of the closure members 18 and 22 associated with the respective tension rolls 15 and 16 (Figure 7) to complete the assembly of the tensiometer as shown in Figure 1.

An operator or operators may then grasp the handles 52 and 53 associated with the foot element 10 and the handles 63 and 64 of the head element 11 and rotate the tensiometer substantially 180 degrees, or from the position shown in Figure 1 to that shown in Figure 2. This causes the tension roll 15 to occupy the position previously occupied by the tension roll 16 and, of course, the tension roll 16 will occupy the position previously occupied by the tension roll 15. As the tensiometer is rotated in the above-noted manner, an S-curve is formed in the strand or web material W.

In the event the tension in the warp is of such magnitude as to prohibit manual rotation of the instrument, mechanical means may be resorted to.

The web material W is under tension at the time the tensiometer is rotated from the position shown in Figure 1 to the position shown in Figure 2 and the tension in the web material passing about the tension roll 16, between the rolls 16 and 15, and then around the tension roll 15, as it moves from left to right in Figure 2, induces a torque on the tension rolls 15 and 16 relative to their common axis of rotation, thereby tending to impart movement to the roll support 12 of the head element 11 in a clockwise direction in Figure 2. The torsional forces placed on the tension rolls 15 and 16 by the web material W passing thereabout in the form of an S-curve, as shown in Figure 2, causes the abutment 67 (Figures 2 to 6, inclusive), to bear against the leg 76 or plug 89 of the substantially U-shaped gauge member 75 so that the leg 76 of the gauge member 75 moves toward the leg 77, the inclined or angular surface 94 on the anvil 93 displacing the spring loaded plunger 86 of the indicator element 85 inwardly to impart thereby movement to the indicator pointer or arm 88, thus indicating the tension in the sheet of strand or web material W.

This portable device may readily be moved from one place to another for use in determining the tension in moving web or strand material.

*Second form of tensiometer*

Referring to Figure 9, there is shown a second form of tensiometer which is very similar to the original form of tensiometer shown in Figures 1 through 8. Therefore, those parts of the second form of tensiometer shown in Figure 9 which are identical to the parts of the original form of the tensiometer shown in Figure 7 will bear the same reference characters as the corresponding parts of the first or original form of the invention with the prime notation added.

It will be noted in Figure 9 that fragmentary parts of side frame members 110 and 111 of a processing machine are shown, these side frame members 110 and 111 being representative of any type of machine through which web or strand material W may be passed under tension, such as a slasher, tenter frame or the like. The modified form of tensiometer shown in Figure 9 differs from the original form of tensiometer shown in Figures 1 through 8 in that the handles associated with the foot and head elements of the device have been omitted and, in lieu thereof, the roll support 14' of the foot element 10' has an extension 112 thereon of any desired configuration for securing the roll support of the foot element 10' to the side frame member 111.

In this instance, the extension 112 is substantially L-shaped and is secured to the frame member 111 by any suitable means such as screws 113. The indicator support 13' also has the handle members omitted therefrom and, in lieu thereof, an extension 115 is provided integral therewith which is of suitable configuration to permit the same to be secured to the side frame member 110. In this instance, the extension 115 is also substantially L-shaped and is secured to the upper surface of the frame member 110 as by screws 116, only one of which screws is shown in Figure 9.

The modified or second form of tensiometer shown in Figure 9 necessarily becomes a part of the machine when secured thereto in the manner disclosed and, therefore, although the tension rolls 15' and 16' may be mounted on the roll supports 12' and 14' associated with the respective head and foot elements 11' and 10' in the same manner in which the tension rolls 15 and 16 are mounted in the original form of the tensiometer, the tension rolls 15' and 16' may be mounted for rotation on the roll supports 12' and 14' in any desired manner since it is not necessary to remove the tension rolls 15' and 16' from the roll supports 12' and 14'.

In this application of the invention, the sheet of web or strand material W is merely threaded about the tension rolls 15 and 16 in the form of an S-curve as shown in Figure 10 at the time the sheet of web or strand material is originally directed into the machine represented by the side frame members 110 and 111. This modified form of tensiometer operates in an identical manner to that in which the original form of tensiometer shown in Figures 1 through 8 operates and, therefore, a further description thereof is deemed unnecessary.

It is also contemplated that the instrument of this invention might be so constructed that the force indicating instrument is easily removable therefrom. Thus, force sensing means might be located at each of a number of web handling machines and a single indicator utilized in association therewith, being carried from location to location.

*Third form of tensiometer*

Referring to Figures 10 through 14, there is shown a third form of tensiometer wherein the structure of the head element differs substantially from that shown in the original and second forms of the invention and, accordingly, those parts of the third form of tensiometer, shown in Figures 10 through 14, which are identical to the parts of the original form of the tensiometer shown in Figure 7 will bear the same reference characters as the corresponding parts of the original form of the invention with the letter "a" affixed thereto.

It will be noted that the head element 11a differs primarily from the head elements 11 and 11' in that the roll supporting spindles 30a and 32a and the gauge member 75a are carried by a common support and this common support is also made in the form of a housing within which the gauge member 75a and associated parts are disposed in order to prevent accumulations of dust, lint or other foreign matter on the same as well as lending a pleasing appearance to the tensiometer.

The head element 11a may also be termed a bracket, housing or roll and gauge support and is preferably of cast construction. The head element comprises a relatively thin vertically disposed plate portion 120 provided with an inwardly projecting boss or roll support portion 121 in which the outer races of the anti-friction bearings 42a are suitably secured, as by a press fit. These two bearings 42a are spaced substantially from each other and have an anti-friction bearing 122 therebetween, the outer race of which is also suitably secured in the boss or roll support portion 121 as by a press fit.

The bearings 42a support the spindles 30a and 32a in the identical manner in which the spindles 30 and 32 are supported in the anti-friction bearings 42 shown in Figure 7, and corresponding ends of the rolls 15a and 16a may be mounted on the spindles 30a and 32a in the identical manner in which the rolls 15 and 16 are mounted on the spindles 30 and 32 in Figure 7.

One end of a stub shaft 123 is rotatably mounted in the anti-friction bearing 122 and this stub shaft 123 projects through the plate portion 120 of the head element 11a in the opposite direction from the direction towards which the spindles 30a and 32a project from the corresponding anti-friction bearings 42a. The axes of the spindles 30a and 32a and the stub shaft 123 extend in substantially parallel relation to each other. Although the anti-friction bearings 42a and 122 are illustrated in Figures 11 through 14, it is to be understood that the spindles 30a and 32a and the stub shaft 123 may be mounted for rotation in any desired manner in the roll support portion 121 of the head element 11a.

Fixed in the outer end of the stub shaft 123 and extending transversely thereof is the medial portion of a force transmitting arm 126 which extends outwardly beyond the opposite edges of the plate portion 120 of the head element 11a and has suitable handles 127 and 128 secured to opposite ends thereof by any suitable means such as welding. These handles 127 and 128 are held in the hands of an operator for supporting this form of the tensiometer when it is being used as shown in Figure 10. The plate portion 120 has an outwardly projecting rib or flange portion 131 integral therewith disposed between the spindle 30a and the stub shaft 123 and which supports a stop member 132 shown in the form of an adjustment screw threadably penetrating the rib or flange portion 131.

The lower end of the stop member 132 in Figure 14 is adapted to, at times, engage the corresponding surface of the force transmitting arm 126. The force transmitting arm 126 has an abutment 134 projecting from the lower face thereof; that is, the face thereof opposite from the face adjacent which the strap member 132 is disposed, this abutment 134 also being shown in the form of an adjustment screw threadably penetrating the force transmitting arm 126.

The rib or flange portion 131 is provided with an opening 135 therein which registers with the adjustment screw 134 so that a suitable sprocket wrench or screw driver may be inserted through this opening 135 for adjusting the screw 134, depending upon the type of adjustment screw employed.

Now, the gauge 75a, which may be identical to the gauge 75, may be supported by the head element 11a in any desired manner provided that the cantilever, comprising the leg portion 76a and the anvil portion 81a are disposed in substantially the position shown relative to the force transmitting arm 126 and has resilient movement relative to the leg portion 77a. In this instance, the plate portion 120 of the head element 11a has an outwardly projecting flange portion 136 integral with the lower edge thereof in Figures 13 and 14, to the upper surface of which the leg 77a of the gauge 75a is suitably secured as by a screw 82a.

The plate portion 120 of the head element 11a also has wall portions 140 and 141 integral therewith which are also integral with the flange portion 136. The upper ends of the wall portions 140 and 141, in Figures 13 and 14, terminate short of the upper flange portion 131 to thus provide openings, defined by the upper flange portion 131 and the upper edges of the walls 140 and 141, through which the force transmitting arm 126 loosely extends. The gauge 75 is positioned so the lower end of the abutment or adjustment screw 134, in Figure 14, registers with the pressure point plug 89a in the leg 76a of the gauge 75a. The abutment or adjustment screw 134 is normally in engagement with this pressure point plug 89a as shown in Figure 14.

The flanges 131 and 136 and walls 140 and 141 define a housing within which the gauge 75a and a substantial portion of the force transmitting arm 126 are disposed. A flanged cover 142, preferably of cast construction and substantially of the same outer configuration as the outer surfaces of the flanges 131 and 136 and the walls 140 and 141, is suitably secured to the walls 141 and the lower flange 136, as by screws 143.

This form of tensiometer operates in a manner similar to that of the original and second forms of the tensiometer and, in order to observe the position of the pointer 88a on the indicator device 85a, the cover 142 has a suitable opening 144 therein which registers with the face of the indicator device 85a or through which the face of the indicator device 85a may project as shown in Figure 13. The cover 142 is shown as being of cast construction and provided with a peripheral flange in Figures 10, 13, and 15, however, the cover 142 may be in the form of a flat plate and suitably secured to the outer edges of the walls 140 and 141 and the flanges 131 and 136 by projecting the flanges 131 and 136 and the walls 140 and 141 outwardly to substantially the vertical plane of the outer face of the indicator device, if desired. This is merely a mechanical equivalent of the cover shown in the drawings and an illustration thereof is deemed unnecessary. The form of tensiometer shown in Figures 10 through 14 operates somewhat differently from the original form of the invention of tensiometer shown in Figures 1 through 7 in that the force transmitting arm 126 is held stationary by an operator and variations in the tension in the sheet of yarns Wa cause the rolls 15a and 16a and the gauge 75a to move in unison about the stub shaft 123 while, on the other hand, in the forms of tensiometers shown in Figures 1 through 8 and 9 the gauge 75 is held stationary by an operator and the rolls 15 and 16 and the force transmitting arm 65 move in unison according to the tension in the sheet of warp yarns W.

It is evident that the rolls 15a and 16a are first positioned astride the sheet of warp yarns Wa, in the course of which the tensiometer shown in Figure 10 would be in an inverted position, after which the operators would rotate the foot and head elements 10a and 11a approximately one hundred eighty degrees to the position shown in Figure 10 to cause the moving sheet of material Wa to pass between the rolls along a substantially S-shaped path to place the rolls 15a and 16a under torsional stresses about the stub shaft 123 according to the tension in the sheet of warp yarns Wa, resulting in the tension in the sheet of warp yarns Wa being transmitted to the indicator pointer or arm 88a for indicating the tension in the sheet of strand or web material Wa.

It should be readily apparent that the use of a gauge of the type illustrated is not essential to the practice of this invention and that anyone skilled in the art could adapt it for use in conjunction with force measuring instruments of other types, such as strain gauges and the like.

In the drawings and specification, there has been set forth a preferred embodiment of the invention and although specific terms are employed, they are used in a generic and descriptive sense only, and not for purposes of limitation, the scope of the invention being defined by the claims.

I claim:

1. A tensiometer for determining the tension in a moving sheet of web or strand material comprising a head element and a foot element adapted to be positioned adjacent opposite edges of the sheet of material, the head element and the foot element each including a roll support, a pair of closely spaced parallel rolls rotatably mounted at opposite ends thereof in the roll supports, at least one indicator support pivotally connected to at least one of the roll supports, a resilient cantilever arm force measuring member fixed on the indicator support, an indicator carried by the indicator support, a cam connection between the force measuring member and the indicator for varying the position of the indicator, and an abutment carried by the roll support associated with the indicator support for transmitting force to the force measuring member, whereby upon the tension in the sheet of web or strand material causing a torsional stress to be placed upon the rolls tending to rotate the rolls and the roll support relative to the indicator support, the abutment will engage and transmit force to the force measuring member to, in turn, effect a variaiton in the position of the indicator to indicate the tension in the sheet of web or strand material.

2. Apparatus for gauging the tension in web or strand material comprising a pair of rolls extending transversely of said material, a common support having a pair of spaced apart self-aligning bearing mountings at each end of said rolls in which the opposite ends of said rolls are universally journaled, an indicator support associated with at least one of said supports for said rolls, gauge and indicator means carried by said indicator support, means responsive to variation between the indicator support and the corresponding support for said rolls for actuating said gauge and indicator means upon movement of said rolls and the latter roll support relative to said indicator support, and said rolls being so positioned as to permit the material to pass under one of said rolls, between said rolls and over the other of said rolls whereby tension in said material will effect movement of said rolls and the supports therefor relative to the indicator support, the pivotal connection between the roll support and the corresponding indicator support being in parallel relation to the axes of the rolls and being disposed at a point substantially bisecting the distance between the rolls.

3. A tensiometer for determining the tension in a moving sheet of material comprising a head element and a foot element adapted to be positioned adjacent opposite edges of the material, the head element and the foot element each including a roll support, a pair of closely spaced parallel rolls rotatably mounted at opposed ends thereof on the roll supports, an indicator support pivotally connected to the roll support of the head element, the pivotal connection between the roll support and the corresponding indicator support being in parallel relationship with the axes of the rolls, a resilient gauge member carried by the indicator support, an indicator carried by the indicator support, a cam and cam follower connection between the resilient gauge member and the indicator for controlling the position of the indicator, an eccentrically positioned abutment carried by the roll support of the head element and movable to engage the resilient gauge member whereby, upon the tension in the sheet of material causing a force to be placed upon the rolls tending to rotate the rolls and the roll support associated with the head element relative to the corresponding indicator support, the abutment will impart the rotational force to the resilient gauge member to, in turn, control the position of the indicator to indicate the tension in the material.

4. A tensiometer for determining the tension in a moving sheet of web or strand material comprising a head element and a foot element, said head and foot elements each respectively including a first support adapted to be disposed in position adjacent the edges of the moving material and roll supports connected to said first supports, a pair of closely spaced rolls having their opposite ends rotatably mounted in said roll supports and being so positioned as to permit the moving material to pass under one of said rolls, then between said rolls and over the other of said rolls whereby, tension in said material will induce torque in said rolls and roll supports, a gauge on at least one of said first supports and means on the associated roll support for transmitting said torque to said gauge, said roll support associated with said last named first support including universal mountings each operatively connected to and supporting one end of each of said rolls.

5. Apparatus for gauging the tension in moving web or strand material comprising an indicator support, a first roll support pivotally mounted on said indicator support, a pair of spindles rotatably mounted in said first roll support, a second roll support, a second pair of spindles rotatably mounted in said second roll support, a pair of rolls removably mounted at their opposite ends on said spindles for rotation relative to said roll supports, said rolls extending transversely of said material and being so disposed as to permit said material to pass over one of said rolls, between said rolls and under one of said rolls, whereby the tension in said material will cause said roll supports to pivot relative to said indicator support, a cam and cam follower operatively connected to said roll support and said indicator support and being responsive to relative movement between said roll supports and said indicator support, and indicator means operatively connected to and responsive to movement of said cam and cam follower for indicating the extent of such movement.

6. A tensiometer for sheet material comprising a foot element and a head element, each including a roll support, having a pair of spaced apart universal mounting means, a pair of closely spaced parallel rolls each rotatably mounted at opposite ends thereof in a respective one of said universal mounting means, said head element also including an indicator support pivotally connected to the corresponding roll support, gauge and indicator means carried by said indicator support in fixed relation thereto, an arm carried by the roll support of the head element and being movable into engagement with the gauge and indicator means, handle means on the foot element, and handle means on the gauge and indicator support of the head element, whereby operators may support the tensiometer by said handle means for restraining movement of the corresponding foot element and the gauge and indicator support of the head element and whereby the sheet material may pass under tension between and above the rolls in S-shaped fashion and the material will tend to rotate the rolls and the roll support of the head element relative to the indicator support to cause the arm to exert pressure on the gauge and indicating means to thereby indicate the tension of the material passing in engagement with said rolls.

7. Apparatus for gauging the tension in web or strand material comprising a pair of rolls adapted to extend transversely of said material, a common support means at each end of said rolls, a pair of self-aligning mountings operatively connected to and supported by each of said common support means, said rolls being each rotatably supported at each end thereof by a corresponding one of said universal mountings, and gauging and indicating means operatively connected to one of said common support means, said gauging and indicating means and said one common support means being relatively movable in response to torsional stress on said rolls about a common axis, said gauging and indicating means being operatively responsive to said relative movement between said common support means and said gauging and indicating means to thereby indicate the torque exerted on said rolls about said common axis.

8. Apparatus according to claim 7 wherein said rolls are each removably connected to at least one of said support means through a releasable coupling.

9. Apparatus for gauging and indicating tension in web or strand material, comprising a pair of rolls, separate self-aligning bearings rotatably supporting each end of each of said rolls, a pair of spaced apart support means each carrying two of said bearings adjacent a respective end of said rolls, and gauging and indicating means operatively connected to one of said supports and responsive to torsional stress on said rolls about a common axis.

10. Apparatus for gauging the tension in strand or web material, comprising a pair of laterally spaced apart rolls, support means for said rolls, gauge and indicator means having a force and motion detecting element, and a cantilever arm operatively connected in motion-imparting controlling relation to said force and motion detecting element, said cantilever arm being movable in response to torsional stresses on said rollers about a common axis.

11. Apparatus according to claim 10 wherein said cantilever arm is operatively connected to said force and motion detecting element through a cam movement.

12. Apparatus according to claim 10 wherein there is provided a further support means, said gauge and indicator means and the root end of said cantilever arm being each fixedly mounted on said further support means, said roll support means and further support means being relatively movable.

13. Apparatus according to claim 10 wherein said support means includes flexible mounting means rotatively supporting each of said rolls for self-aligning movement.

14. Apparatus according to claim 13 wherein said cantilever arm is operatively connected to said force detecting element through a cam movement.

15. Apparatus for gauging the tension in strand or web material, comprising a pair of spaced generally parallel rolls, support means for said rolls, gauge and indicator means having a movable detecting element, a cantilever arm, means operatively connecting said cantilever arm in force and motion transmitting relation to said detecting element, said cantilever arm being movably responsive to torsional stress on said rolls about a common axis.

16. Apparatus according to claim 15 wherein said operatively connecting means includes a member having a cam surface.

17. Apparatus according to claim 16 wherein said support means for said rolls includes self-aligning connecting means for each of said rolls.

18. Apparatus according to claim 15 wherein said cantilever arm is fixedly connected at one end to said roll support means, said apparatus further comprising means for restraining the free end of said cantilever arm against movement in one direction.

19. Apparatus for gauging the tension in strand or web material, comprising a pair of spaced generally parallel rolls, support means for said rolls, gauge and indicator means having a movable force and motion detecting element, and rotary to radially lineal force and motion translating means operatively connected between said detecting element and said rolls for translating torsional stresses on said rolls about a common axis into operative movement of said detecting element.

20. In an instrument for measuring tension in sheet material, the combination of a pair of laterally spaced apart tension sensing rolls, means supporting each of said rolls for rotation about a separate individual axis, common support means supporting both of said rolls for rotation of at least one end thereof about a common axis, each of said axes extending in a substantially similar longitudinal direction, force gauging means supported adjacent said one end, an indicator associated with said force gauging means and actuated in response thereto, a movable cam and associated cam follower operatively connected to and between said gauging means and said common support means, said common support means and said gauging means being relatively movable in response to a torque exerted on said rolls about said common axis, said cam and cam follower being movable in response to relative movement between said gauging means and said common support means, said gauging means being responsive to movement of said cam and cam follower, whereby the torque induced in said rollers about said common axis by the passage of sheet material between and about the same in S-shaped fashion is transmitted to said gauging means through the medium of said cam and the cam follower.

References Cited in the file of this patent

UNITED STATES PATENTS 2,538,932    Campbell _____ Jan. 23, 1951